(12) United States Patent
Mowatt et al.

(10) Patent No.: US 8,011,383 B2
(45) Date of Patent: Sep. 6, 2011

(54) FUEL TANK FOR AN AGRICULTURAL VEHICLE

(75) Inventors: Jeffrey William Mowatt, Billericay (GB); Thomas Charles Kindred, Wickford (GB)

(73) Assignee: CNH America LLC, New Holland, PA (US)

( * ) Notice: Subject to any disclaimer, the term of this patent is extended or adjusted under 35 U.S.C. 154(b) by 1047 days.

(21) Appl. No.: 11/653,596

(22) Filed: Jan. 16, 2007

(65) Prior Publication Data

US 2007/0163660 A1 Jul. 19, 2007

(30) Foreign Application Priority Data

Jan. 18, 2006 (GB) .................................. 0600994.8

(51) Int. Cl.
*F17D 1/00* (2006.01)
(52) U.S. Cl. ........ 137/572; 137/256; 180/314; 220/23.4
(58) Field of Classification Search .................. 137/575, 137/572, 256, 259, 587, 571; 280/479.1, 280/7, 834; 220/562, 23.4, 23.6, 23.83; 180/314
See application file for complete search history.

(56) References Cited

U.S. PATENT DOCUMENTS

| | | | | |
|---|---|---|---|---|
| 1,261,878 A | * | 4/1918 | West | 137/572 |
| 2,376,336 A | | 5/1945 | Brown | |
| 3,409,040 A | * | 11/1968 | Weston et al. | 137/572 |
| 3,512,795 A | | 5/1970 | Naeve | |
| 3,586,363 A | * | 6/1971 | Omlid | 137/575 |
| 3,677,284 A | * | 7/1972 | Mendez | 137/572 |
| 4,288,086 A | | 9/1981 | Oban | |
| 4,552,175 A | * | 11/1985 | Schiemann | 137/571 |
| 4,852,892 A | * | 8/1989 | Reid | 137/874 |
| 4,974,645 A | * | 12/1990 | Johnson | 137/587 |
| 5,738,380 A | * | 4/1998 | Zipser et al. | 137/571 |
| 5,873,383 A | * | 2/1999 | Takai et al. | 137/571 |
| 5,924,514 A | | 7/1999 | Bullerdick | |
| 5,950,688 A | * | 9/1999 | Langlois | 137/587 |
| 5,975,574 A | * | 11/1999 | Warth | 280/834 |
| 6,460,562 B1 | * | 10/2002 | Hart | 137/351 |
| 2001/0054615 A1 | | 12/2001 | Krogull | |
| 2003/0150507 A1 | | 8/2003 | Channing | |

FOREIGN PATENT DOCUMENTS

| | | |
|---|---|---|
| DE | 4126755 | 2/1993 |
| EP | 0 182 980 | 11/1984 |
| GB | 1151602 | 5/1969 |

* cited by examiner

*Primary Examiner* — Stephen M Hepperle
*Assistant Examiner* — Andrew J Rost
(74) *Attorney, Agent, or Firm* — Patrick M. Sheldrake; Michael G. Harms

(57) ABSTRACT

A fuel tank for an agricultural vehicle, comprises a main fuel tank 10 having a filler pipe 11 and a separate inlet 15 and a removable auxiliary tank 30 having a second filler pipe 32 and an outlet 36 for supplying fuel into the separate inlet 15 of the main tank. To avoid spillage from the filler pipe of the main tank 10, in one aspect of the invention, a valve 16 is provided in the main fuel tank 10 to close off the second inlet 15 when the fuel level within the main tank 10 reaches a predetermined level. In a second aspect of the invention, spillage is avoided by means of an extension tube 40 which sealingly engages the filler tube 11 of the main tank at its lower end and opens at its upper end into the filler pipe 46 of the auxiliary tank 30.

12 Claims, 1 Drawing Sheet

FUEL TANK FOR AN AGRICULTURAL VEHICLE

FIELD OF THE INVENTION

The present invention relates to a fuel tank for an agricultural vehicle, in particular a tractor.

BACKGROUND OF THE INVENTION

The size of a fuel tank on a tractor is necessarily a compromise. Ideally the fuel tank should be as large as possible to maximize its range. However, the tank is normally mounted within the field of view of the driver, usually between a front wheel and the steps leading to the cab of the tractor and, if the size of the tank is increased, it obscures the visibility of the front wheel.

SUMMARY OF THE INVENTION

According to one aspect of the present invention, there is provided a fuel tank for an agricultural vehicle, comprising a main fuel tank having a filler pipe and a separate inlet and a removable auxiliary tank having a second filler pipe and an outlet for supplying fuel into the separate inlet of the main tank, wherein a valve is provided in the main fuel tank to close off the second inlet when the fuel level within the main tank reaches a predetermined level.

The valve for preventing overfilling of the main tank from the auxiliary tank may conveniently be constructed as a float operated valve. The design of such valves is well known from numerous applications, amongst them the valves used in the float chambers of carburetors.

According to a second aspect of the invention, there is provided a fuel tank for an agricultural vehicle, comprising a main tank having a first filler pipe and a separate inlet, a removable auxiliary tank having a second filler pipe and an outlet for supplying fuel into the separate inlet of the main tank, and an extension tube sealingly engaging the filler tube of the main tank at its lower end and opening at its upper end into the filler pipe of the auxiliary tank.

The invention overcomes the need for compromise by allowing the fuel storage capacity to be expanded as and when required. When performing a task for which visibility of the front wheel is not critical, an auxiliary tank can be mounted above the main fuel tank allowing increased range by taking advantage of the combined fuel storage capacity of the two tanks. On the other hand, when performing a task for which visibility of the front wheel is critical, the auxiliary tank can be removed so as not to obstruct the field of view of the operator.

There have been proposed in the prior art (see for example U.S. Pat. No. 4,552,175 and GB 1,151,602) auxiliary fuel tanks which act as emergency reservoirs. In contrast to the present invention, these tanks do not normally replenish the main tank but remain full until such time as the main tank is empty, whereupon a connection between the tanks is opened manually to allow the vehicle to be driven to a fuel station.

EP 0 182 980 teaches using the luggage compartment of a motor vehicle to house an auxiliary fuel tank, to extend the range of the vehicle when the luggage compartment is not otherwise occupied. In this proposal, the level of the fuel in the auxiliary fuel tank always remains below the level of the filler cap fitted to the end of the filler pipe of the main tank. Consequently, the connection between the two tanks can be a permanent one, without any risk of fuel spillage through overfilling of the main tank. Such a solution cannot however be adopted in the case of a tractor as the auxiliary fuel tank will necessarily be mounted on the tractor higher than the level of the filler cap of the main tank. In contrast to the latter patent, the connection between the auxiliary tank and the main tank in the first aspect of the present invention is only opened automatically when the fuel level in the main tank drops below a predetermined level, the two tanks being isolated from one another once the fuel in the main tank reaches the predetermined level.

The second aspect of the invention overcomes the same problem by using an extension tube to interconnect the filler pipes of the two tanks thereby preventing spillage from the filler pipe of the main tank.

Even in the first aspect of the invention, it is preferred to provide an extension tube to connect the filler pipe of the main fuel tank to that of the auxiliary tank, in order to safeguard against the possibility of fuel spillage in the event of a failure of the level sensing valve in the second inlet of the main tank.

Advantageously, the separate inlet includes a quick release connector to allow a connection to be established automatically with the auxiliary tank when the latter is mounted above the main tank.

The quick release connector may conveniently include valves which are automatically closed when the two tanks are separated from one another, thereby allowing the auxiliary tank to be mounted on or removed from the main tank while it still contains fuel, without the risk of fuel spillage. Connectors of this type are known and are used, for example, on hoses to prevent water from gushing out of the hose when changing the implement fitted to the end of the hose.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
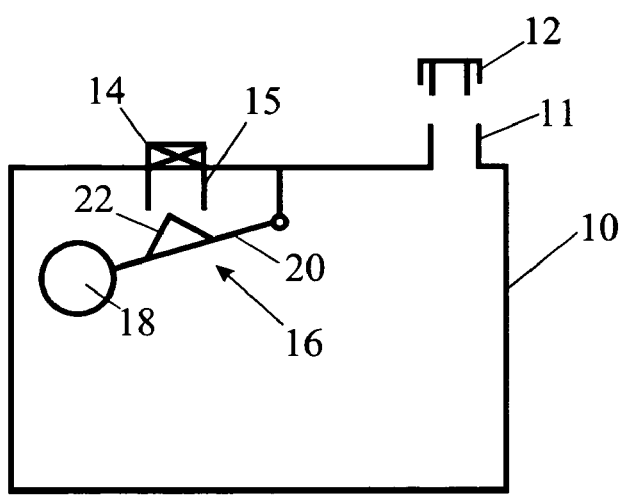
FIG. 1 is a schematic section through a main fuel tank of the invention.
Figure 4:
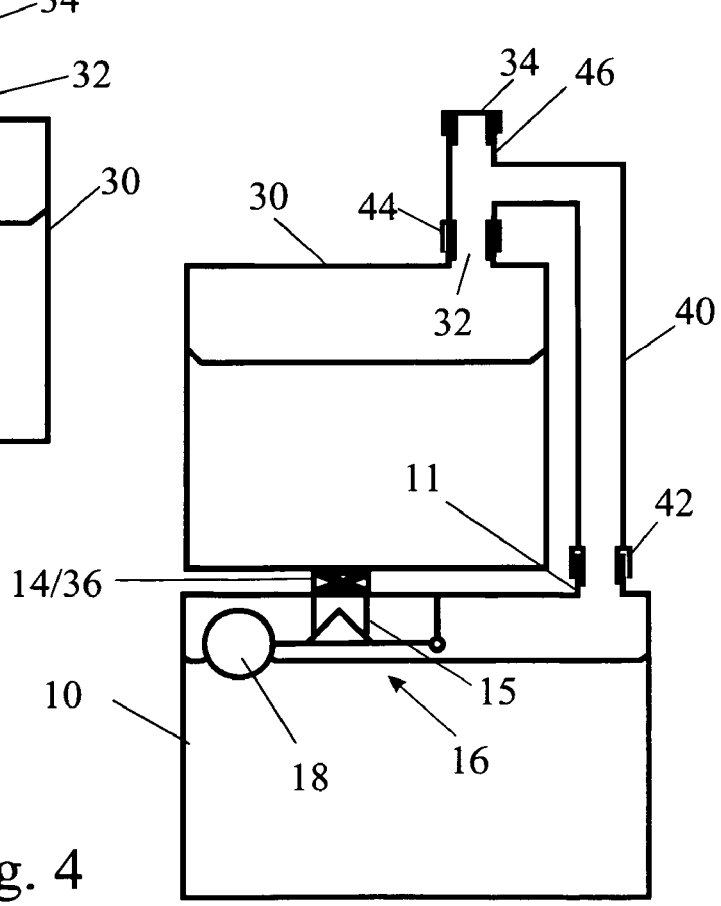
FIG. 4 is a section showing the three components of FIGS. 1, 2 and 3 connected to one another to provide an increased fuel storage capacity.

The main fuel tank 10 shown in FIGS. 1 and 4 has a conventional filler pipe 11 and filler cap 12. In addition, the tank 10 has a separate inlet 15 fitted with an external connector 14. A fuel level sensing valve 16 is mounted within the tank 10 to close the second inlet 15 when the fuel level reaches a maximum level. The valve 16 comprises an arm 20 that is pivoted at one end and fitted with a float 18 at its other end. The arm 18 also carries a valve closure element 22 which blocks the second inlet 15 when the level of the fuel in the tank 10 reaches its maximum level, as shown in FIG. 4.

Figure 2:
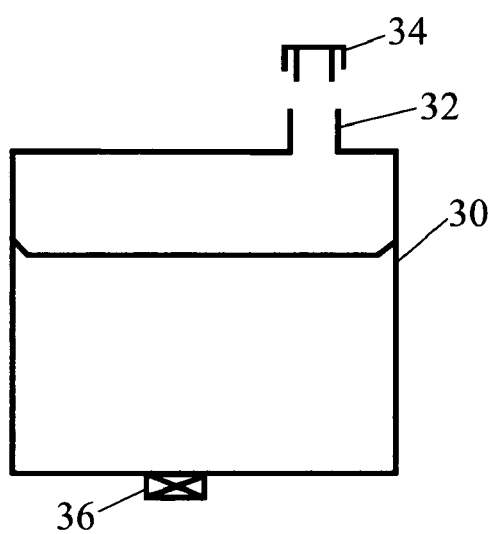
FIG. 2 is a similar section through an auxiliary fuel tank.

The purpose of the second inlet is to allow the mounting above the main tank 10 of an auxiliary tank 30 as shown in FIGS. 2 and 4. The auxiliary tank 30 has its own filler pipe 32 and filler cap 34 and is additional fitted on its underside with a connector 36 which sealingly mates with the connector 14 on the top of the main fuel tank 10. The connectors 14 and 36, as is known per se, may contain valves which are closed when the connectors are separated from one another and which open automatically when the connectors 14 and 36 are mated with one another, as shown in FIG. 4.

Figure 3:
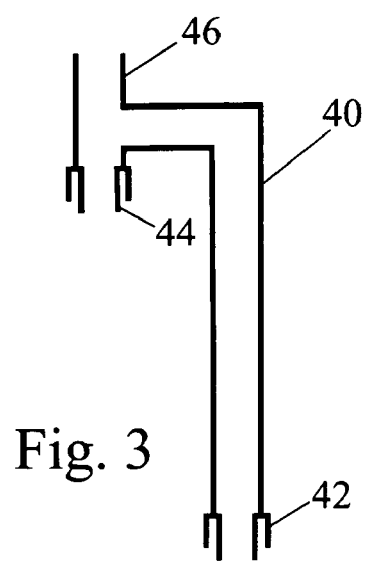
FIG. 3 is a section through an extension tube for connecting the filler pipes of the main tank and the auxiliary tank.

FIG. 3 shows an extension tube 40 having fittings 42 and 44 to allow it to seal against the filler pipes 11 and 32 of the main and auxiliary tank, respectively, and providing a further filler pipe 46 covered by the filler cap 34 when the two tanks 10 and 30 are connected to one another, as shown in FIG. 4.

The main tank 10 can be used on its own whenever mounting the auxiliary tank above it would unacceptably obscure the operator's visibility. In this case, the valve 14 closes off the ullage space of the tank, which can be vented in the normal way to remain under atmospheric pressure as fuel is drawn from the tank. The tank is usually vented through the filler cap 12 but, to avoid hydrocarbon emission into the atmosphere, a vapor canister may be installed in a venting line (not shown) of the main tank 10.

To extend the range of the tractor when the operator can tolerate the front wheel being obscured, the auxiliary tank 30 is mounted above the main tank 10 so that its connector 36 mates with the connector 14 of the main tank and establishes a sealed connection that allows fuel to flow from the auxiliary tank 30 into the main tank. When the connectors 14 and 36 are not mated, the connector 36 closes off the auxiliary tank 10 so that the auxiliary tank may be removed and refitted even if it is not empty.

The auxiliary tank 30 does not rely on the connector 36 to support its weight and other mountings, not shown, are used to secure the auxiliary tank 30 in position above the main tank 10.

When the two tanks 10 and 30 are interconnected, all the fuel in the auxiliary tank will attempt to drain into the lower main tank but the level sensing valve 16 will act to shut off the connection as soon as the fuel in the main tank 10 reaches its maximum level. As fuel is drawn from the main tank 10, the valve 16 will open and close automatically to maintain the main tank 10 full until such time as the auxiliary tank 30 is empty.

When the level of the fuel in the main tank 10 runs low, the auxiliary tank is filled through its filler pipe. The fuel will drain into the main tank 10 until the latter is full, whereupon closure of the valve 16 will allow the fuel in the auxiliary tank 30 to be replenished.

It can be seen from the above that the filler pipe of the main tank is never used when the auxiliary tank 30 is in use and one could simply close the filler pipe 11 using the filler cap 12. However, if the ullage space of the main tank is vented to atmosphere through the filler cap, there is a danger of fuel spillage through the filler pipe 11 if the valve 16 should malfunction.

To avoid this problem, the extension tube 40 is used to interconnect the inlet pipes of the two tanks 10 and 30. Even if the level of the fuel in the main tank 10 should rise above its filler pipe 11, fuel will not leak but will merely climb up the extension tube 40 which is sealed relative to the filler pipe 11 of the main tank 10 at its lower end.

Because the provision of the extension tube 40 allows the two tanks to work in unison even when the level sensing valve 16 is not functioning, it is possible in the second aspect of the invention to use only the extension tube 40 and dispense with the level sensing valve 16. The presence of the level sensing valve 16 is however preferred as less reliance is then placed on achieving a perfect seal between the extension tube 40 and the filler pipe 11 of the main tank.

We claim:

1. A fuel tank for an agricultural vehicle, comprising
a main fuel tank having first and second separate inlets and flow paths, wherein the first inlet includes a first filler pipe;
a removable auxiliary tank having a second filler pipe and an outlet for supplying fuel into the second inlet of the main tank, wherein a valve is provided in the main fuel tank to close off the second inlet when the fuel level within the main tank reaches a predetermined level; and
an extension tube for connecting the first filler pipe of the main fuel tank to that of the auxiliary tank, the extension tube having a first connector for sealingly engaging the first filler pipe of the main tank at its lower end and having a third filler pipe at its upper end, the extension tube having a second connector located above the first connector and below the third filler pipe and positioned such that when the main fuel tank is filled below the predetermined level, the flow path of fuel entering the third filler pipe is through the second filler pipe and auxiliary tank into the main fuel tank.

2. A fuel tank as claimed in claim 1, wherein the valve for preventing overfilling of the main tank from the auxiliary tank is constructed as a float operated valve, the tanks and valves configured such that when the removable auxiliary tank is connected to the main fuel tank, fuel flowing into the second inlet will flow through the auxiliary tank and outlet into the main fuel tank, wherein the valve is not closed to allowing filling of the auxiliary tank until a predetermined level within the main tank is reached.

3. A fuel tank as claimed in claim 1, further comprising a quick release connector between the outlet of the auxiliary tank and second inlet of the main fuel tank to allow a connection to be established automatically with the auxiliary tank when the latter is mounted above the main tank and to close at least the outlet when the two tanks are separated, wherein upon separation of the tanks both the outlet of the auxiliary tank and the second inlet of the main tank are both closed.

4. A fuel tank as claimed in claim 1, wherein the outlet of the auxiliary tank and the valve of the main tank are positioned and configured such that when the tanks are coupled the auxiliary tank will not retain fuel entering the auxiliary tank until the main fuel tank is generally full.

5. A fuel tank as claimed in claim 1, wherein in a closed position the valve is configured to interrupt flow through the auxiliary tank to main fuel tank such that fuel entering the auxiliary tank is retained in the auxiliary tank.

6. A fuel tank for an agricultural vehicle, comprising a main tank having a first filler pipe and a separate inlet into the tank from that of the first filler pipe, a removable auxiliary tank offset upward from the main fuel tank and having a second filler pipe and an outlet for supplying fuel into the separate inlet of the main tank, the outlet configured to permit direct passage of flow from the second filler pipe into the main fuel tank through the auxiliary tank until a predetermined amount of fuel is present in the main fuel tank; and
an extension tube having a first connector for sealingly engaging the first filler pipe of the main tank at its lower end and having a third filler pipe at its upper end the extension tube having a second connector located above the first connector and below the third filler pipe, the second connector positioned such that fuel entering the third filler pipe will be directed into the second filler pipe of the auxiliary tank, wherein when the main fuel tank is filled below the predetermined amount, the flow path of fuel entering the third filler pipe is into the auxiliary tank through the second filler pipe and then exiting the auxiliary tank through the outlet into the main fuel tank.

7. A fuel tank as claimed in claim 6, wherein the separate inlet includes a quick release connector to allow a connection to be established automatically with the auxiliary tank when the latter is mounted above the main tank.

8. A fuel tank as claimed in claim 7, wherein the quick release connector includes valves which automatically close sealing the second inlet and the outlet when the two tanks are separated from one another.

9. A fuel tank as claimed in claim 6, wherein the extension tube and first and second connector are positioned such that flow path of fuel exceeding a volume of the main fuel tank is directed by the first filler pipe into the extension tube and then upwardly towards the second connector then to the auxiliary tank.

10. A fuel tank as claimed in claim 9, wherein the main fuel tank is configured to vent through the extension tube by way of the first filler pipe and to the atmosphere through the third filler pipe.

11. A fuel tank as claimed in claim 6, further comprising a tank connector assembly configured for removably coupling the modular auxiliary tank and the main tank, the connector assembly including at least one valve in the flow path between the outlet of the auxiliary tank and the second inlet of the main fuel tank, wherein when the tanks are in a coupled configuration and fuel level of the main fuel tank is below a predetermined amount, the valve is configured to open draining fuel located in or entering the auxiliary tank into the main tank, the valve configured to close once the fuel level is above the predetermined amount such that fuel cannot drain from the auxiliary tank; and wherein when the tanks are in an uncoupled configuration the connector assembly is configured to seal the outlet of the auxiliary tank preventing drainage of fuel therefrom.

12. The fuel tank of claim 11, wherein in an uncoupled configuration the main fuel tank is configured to receive fuel through the first inlet and the second inlet is closed.

* * * * *